United States Patent
Liu et al.

(10) Patent No.: US 12,278,334 B2
(45) Date of Patent: Apr. 15, 2025

(54) LITHIUM-ALUMINUM HYDROTALCITE-BASED SOLID ELECTROLYTE FILM WORKING AT ROOM TEMPERATURE, PREPARATION METHOD THEREOF, AND LITHIUM BATTERY INCLUDING SAME

(71) Applicant: BEIJING UNIVERSITY OF CHEMICAL TECHNOLOGY, Beijing (CN)

(72) Inventors: Wen Liu, Beijing (CN); Minggui Xu, Beijing (CN); Xiaoming Sun, Beijing (CN); Jijin Yang, Beijing (CN); Ting Gao, Beijing (CN); Xiwen Lu, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 18/696,871

(22) PCT Filed: Dec. 22, 2021

(86) PCT No.: PCT/CN2021/140302
§ 371 (c)(1),
(2) Date: Mar. 28, 2024

(87) PCT Pub. No.: WO2023/082434
PCT Pub. Date: May 19, 2023

(65) Prior Publication Data
US 2024/0421347 A1    Dec. 19, 2024

(30) Foreign Application Priority Data
Nov. 12, 2021 (CN) .......................... 202111337243.0

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC ..................... H01M 10/0562; H01M 10/0525
(Continued)

(56) References Cited

U.S. PATENT DOCUMENTS

| 6,706,249 B1 * | 3/2004 | Komatsu | C01G 1/00 556/42 |
| 2017/0271731 A1 * | 9/2017 | Hayashi | H01M 10/26 |
| 2019/0305278 A1 * | 10/2019 | Saeki | H01M 10/0587 |

FOREIGN PATENT DOCUMENTS

| CN | 101276658 A * | 10/2008 | ....... H01M 10/052 |
| CN | 102035044 A | 4/2011 | |

(Continued)

OTHER PUBLICATIONS

Meyn et al., Anion-Exchange Reactions of Layered Double Hydroxides, 1990, Inorganic Chemistry, 29, 5201-5207 (Year: 1990).*

(Continued)

*Primary Examiner* — Sean P Cullen
(74) *Attorney, Agent, or Firm* — CM Law PLLC; Robert C. Klinger

(57) ABSTRACT

Disclosed are a lithium aluminum hydrotalcite-based solid electrolyte film, a preparation method and use thereof, and a lithium battery including the same. The lithium aluminum hydrotalcite-based solid electrolyte film includes: a solid electrolyte film substrate formed by an organic polymer, and a lithium salt and a lithium aluminum hydrotalcite uniformly dispersed in the solid electrolyte film substrate, wherein the lithium aluminum hydrotalcite has a content of 50 wt % to
(Continued)

80 wt %, based on a total mass of the solid electrolyte film substrate after removal of the lithium salt; and the organic polymer includes one or more selected from the group consisting of polyethylene glycol diacrylate, polyethylene oxide, polypropylene carbonate, and polyvinylidene fluoride-hexafluoropropylene copolymer.

5 Claims, 14 Drawing Sheets

(58) Field of Classification Search
USPC .............. 429/189, 303, 304, 305, 319, 322
See application file for complete search history.

(56) References Cited

FOREIGN PATENT DOCUMENTS

| CN | 107359364 | A | * | 11/2017 | .............. C08J 3/246 |
| CN | 108110316 | A | * | 6/2018 | ........ H01M 10/0525 |
| KR | 2008105587 | A | * | 12/2008 | |
| WO | 2021188418 | A1 | | 9/2021 | |

OTHER PUBLICATIONS

Cho et al., Nanocomposites of polymer gel electrolyte based on poly(ethylene glycol diacrylate) and Mg—Al layered double hydroxides, 2004, Polymer International, 53, 1523-1528 (Year: 2004).*
Cho et al., Gel polymer electrolyte nanocomposites PEGDA with Mg—Al layered double hydroxides, 2004, Electrochimica Acta, 50, 331-334 (Year: 2004).*
International Search Report and Written Opinion mailed Jun. 29, 2022, from PCT/CN2021/140302, 11 sheets including English translation.
Xia, Shuixin et al., "Ultrathin Layered Double Hydroxide Nanosheets Enabling Composite Polymer Electrolyte for All-Solid-State Lithium Batteries at Room Temperature," Advanced Functional Materials, vol. 31, No. 28, Apr. 22, 2021 (Apr. 22, 2021), pp. 2101168(1-11).
First Chinese Office Action dated Aug. 10, 2022, from Chinese Patent Application No. 202111337243.0, 21 sheets including English translation.
Second Chinese Office Action dated Apr. 29, 2023, from Chinese Patent Application No. 202111337243.0, 9 sheets including English translation.

* cited by examiner

LITHIUM-ALUMINUM HYDROTALCITE-BASED SOLID ELECTROLYTE FILM WORKING AT ROOM TEMPERATURE, PREPARATION METHOD THEREOF, AND LITHIUM BATTERY INCLUDING SAME

CROSS REFERENCE TO RELATED APPLICATIONS

The present application is a National Stage application of International Patent Application No. PCT/CN2021/140302, filed on Dec. 22, 2021, which claims priority to the Chinese Patent application Ser. No. 202111337243.0, filed with the China National Intellectual Property Administration (CNIPA) on Nov. 12, 2021, and entitled "LITHIUM ALUMINUM HYDROTALCITE-BASED SOLID ELECTROLYTE FILM WORKING AT ROOM TEMPERATURE, PREPARATION METHOD THEREOF, AND LITHIUM BATTERY INCLUDING SAME," disclosures of which are incorporated herein by reference in its entirety.

TECHNICAL FIELD

The present disclosure belongs to the technical field of solid electrolyte films, and in particular relates to a lithium aluminum hydrotalcite-based solid electrolyte film working at room temperature, a preparation method thereof, and a lithium battery including the same, a preparation method and use thereof, and a lithium battery including the same.

BACKGROUND

Since the industrialization of lithium-ion batteries by Sony Corporation of Japan in 1991, they have played a vital role in fields such as various 3C products, power batteries, and large-scale energy storage. With the development of the national economy, advanced requirements have been put forward for lithium-ion batteries, including high energy density and high safety. Therefore, it is urgent to develop lithium-ion batteries with both high energy density and high safety to meet the requirements of the new era. Most current lithium-ion batteries use liquid organic electrolytes such as esters and ethers, as electrolytes. However, the liquid organic electrolytes have safety problems such as leakage, easy volatilization, and easy combustion or even explosion. In addition, during the cycle process of a battery, the generation of lithium dendrites will also puncture the separator and cause safety accidents. As a result, solid electrolytes have attracted attention. In general, solid electrolytes are better than liquid electrolytes in terms of thermal stability, chemical stability, electrochemical stability, and mechanical strength. In addition, theoretically, the use of solid electrolytes can fundamentally eliminate the potential safety hazard of easy combustion and explosion in conventional lithium-ion batteries with liquid electrolytes. At the same time, the solid electrolyte can have an electrochemical stability window of up to 5 V or more, allowing it to be matched with a high-voltage cathode material to improve the energy density of a battery system. In addition, the solid electrolyte can also realize more stable ion transport, and then realize more uniform lithium metal deposition, thereby effectively inhibiting the growth of lithium dendrites.

At present, the solid electrolytes for lithium-ion/lithium-metal secondary batteries are mainly divided into the following three categories: solid polymer electrolytes, inorganic solid electrolytes, and organic/inorganic composite solid electrolytes. Solid polymer electrolytes have attracted extensive attention from scientific researchers due to their advantages such as light weight, excellent elasticity, excellent machinability, and easy molding. However, solid polymer electrolytes have disadvantages such as low ionic conductivity at room temperature and poor mechanical properties. Inorganic solid electrolytes, also known as superionic conductors, can be mainly divided into oxide solid electrolytes, sulfide solid electrolytes, and nitride solid electrolytes according to chemical compositions. Compared with solid polymer electrolytes, inorganic solid electrolytes have advantages such as high ionic conductivity at room temperature, high mechanical strength, and excellent flame retardancy, but also have disadvantages such as poor mechanical properties, high interfacial resistance, growth of lithium dendrites along grain boundaries, and partial instability. Since the single solid polymer electrolyte and inorganic solid electrolyte prepared currently cannot meet people's needs, researchers have considered the addition of an inorganic filler to a polymer electrolyte or the compounding of solid polymer electrolyte with inorganic solid electrolyte to combine the advantages of both to further optimize the performance of the resulting solid electrolyte. According to the design concept of "combining rigidity and flexibility", the preparation of organic/inorganic composite solid electrolyte by combining a rigid inorganic phase with a flexible organic phase can realize the solid electrolyte having the characteristics of both high mechanical properties and high ionic conductivity at room temperature to some extent. Although many researchers have conducted a series of studies in this aspect in recent years, organic/inorganic composite solid electrolytes still cannot perfectly combine the advantages of organic and inorganic phases, which will inevitably lead to the degradation of some properties. However, organic/inorganic composite solid electrolytes are still the most promising solid electrolytes for industrialization.

Some time ago, a team of Professor Zheng Shiyou in the University of Shanghai for Science and Technology designed a single-layer lamellar lithium aluminum hydrotalcite nanosheet (SLN)-reinforced polyvinylidene fluoride-hexafluoropropylene (PVDFHFP) composite polymer electrolyte with a low loading of 1 wt %, which exhibited an ionic conductivity of $2.2 \times 10^{-4}$ S·cm$^{-1}$ at room temperature, an excellent Li transport number, and a wide electrochemical window (4.9 V).

However, the above composite polymer electrolyte has an conductivity of just over $10^{-5}$ S·cm$^{-1}$ at room temperature, and an electrochemical window of just less than 5 V.

SUMMARY

A first aspect of the present disclosure provides a lithium aluminum hydrotalcite-based solid electrolyte film working at room temperature, including: a solid electrolyte film substrate formed by an organic polymer, and a lithium salt and a lithium aluminum hydrotalcite uniformly dispersed in the solid electrolyte film substrate, wherein the lithium aluminum hydrotalcite has a content of 50 wt % to 80 wt %, based on a total mass of the solid electrolyte film substrate after removal of the lithium salt; and the organic polymer includes one selected from the group consisting of polyethylene glycol diacrylate (PEGDA), polyethylene oxide (PEO), polypropylene carbonate (PPC), and polyvinylidene fluoride-hexafluoropropylene copolymer (PVDF-HFP).

The lithium aluminum hydrotalcite is a powder having a particle size of less than 75 μm.

In some embodiments, the solid electrolyte film has a thickness of 30 μm to 120 μm.

In some embodiments, the lithium aluminum hydrotalcite includes a meta-aluminate ion, and the lithium aluminum hydrotalcite further includes one or a combination of two or more selected from the group consisting of a chloride ion, a nitrate ion, a carbonate ion, and a sulfate ion.

In some embodiments, the PEGDA has a molecular weight of 700, the PEO has a molecular weight of 600,000, and the PPC has a molecular weight of 50,000.

A second aspect of the present disclosure provides a method for preparing a lithium aluminum hydrotalcite-based solid electrolyte film working at room temperature, including:

step 1) dissolving a water-soluble lithium salt, a water-soluble aluminum salt, and a water-soluble meta-aluminate in deionized water that has been introduced with an inert gas and boiled to remove carbon dioxide to obtain a first mixture, subjecting the first mixture to ultrasound or stirring to dissolve, then adding an alkali thereto to adjust a pH of the first mixture to 9 to 11, and controlling a temperature at 60° C. to 80° C., subjecting a resulting adjusted first mixture to a reaction to produce a lithium aluminum hydrotalcite;

step 2) calcination and grinding: placing the lithium aluminum hydrotalcite obtained in step 1) under protection of an inert gas, calcining at 100° C. to 150° C. for 2 h to 6 h to remove water between hydrotalcite layers to obtain a calcined sample, then grinding the calcined sample to power to obtain a lithium aluminum hydrotalcite powder;

step 3) preparing a lithium aluminum hydrotalcite-based solid electrolyte slurry for later use by the following operations in a glove box:

adding an organic solvent, an organic polymer, and a lithium salt into a container to obtain a second mixture, stirring the second mixture to complete dissolution, then adding the lithium aluminum hydrotalcite powder to the second mixture to obtain a third mixture, subjecting the third mixture to ultrasound or stirring to homogeneous dispersion, then adding a photoinitiator or a thermal initiator thereto to obtain the lithium aluminum hydrotalcite-based solid electrolyte slurry; and step 4) performing the following operations in a glove box:

subjecting the lithium aluminum hydrotalcite-based solid electrolyte slurry obtained in step 3) to curing and film-forming to obtain the lithium aluminum hydrotalcite-based solid electrolyte film;

wherein the organic polymer includes one selected from the group consisting of PEGDA, PEO, PPC, and PVDF-HFP.

In some embodiments, in step 1), the water-soluble lithium salt is one or more selected from the group consisting of lithium chloride, lithium nitrate, lithium carbonate, and lithium sulfate; the water-soluble aluminum salt is one or more selected from the group consisting of aluminum chloride, aluminum nitrate, aluminum carbonate, and aluminum sulfate; and a molar ratio of lithium to aluminum is in a range of 1:2 to 1:5.

In some embodiments, in step 1), the inert gas is nitrogen.

In some embodiments, the lithium aluminum hydrotalcite powder obtained after the grinding in step 2) has a particle size of less than 75 μm.

In some embodiments, in step 2), during the calcination process, the inert gas is argon and a heating rate is in a range of 5° C./min to 10° C./min.

In some embodiments, in step 3), the organic solvent is one or more selected from the group consisting of N,N-dimethylacetamide (DMAC), acetonitrile, ethylene carbonate (EC), and propylene carbonate (PC).

In some embodiments, the photoinitiator is phenylbis(2, 4,6-trimethylbenzoyl) phosphine oxide, and the thermal initiator is azobisisobutyronitrile (AIBN).

In some embodiments, in step 4), the curing and film-forming is conducted by a process including:

under the condition that the solid electrolyte slurry contains the PEGDA as the organic polymer and the photoinitiator is used in step 3), transferring the slurry to a polytetrafluoroethylene (PTFE) plate, subjecting the slurry to scrape coating, then irradiating with an ultraviolet (UV) lamp with a UV wavelength of 365 nm for 5 min to 20 min, so that the slurry is cured to form the film; or under the condition that the solid electrolyte slurry contains the PEGDA as the organic polymer and the thermal initiator is used in step 3), subjecting the slurry to scrape coating, then heating on a heating stage at 60° C. for 5 min to 20 min, so that the slurry is cured to form the film;

under the condition that the solid electrolyte slurry without the PEGDA as the organic polymer, pouring the slurry into a PTFE mold to form a film through solution-casting, and drying the film in a drying oven for 12 h to 36 h to remove the organic solvent therein to obtain the lithium aluminum hydrotalcite-based solid electrolyte film.

In some embodiments, under the condition that the organic polymer includes PEGDA or the PEO, a molar ratio of an ethylene oxide (EO) segment to lithium ion is in a range of 16:1 to 20:1.

A third aspect of the present disclosure provides a lithium battery, including the lithium aluminum hydrotalcite-based solid electrolyte film working at room temperature described in the first aspect.

A fourth aspect of the present disclosure provides use of the lithium aluminum hydrotalcite-based solid electrolyte film working at room temperature described in the first aspect, wherein the lithium aluminum hydrotalcite-based solid electrolyte film has a room temperature conductivity of greater than $10^{-3}$ S·cm$^{-1}$ and an electrochemical stability window of greater than 5 V.

A partial lithium aluminum hydrotalcite-based solid electrolyte film has a room temperature conductivity of greater than $10^{-4}$ S·cm$^{-1}$.

Compared with the prior art, the present disclosure has the following beneficial effects:

1) In the present disclosure, a lithium aluminum hydrotalcite-based organic/inorganic composite solid electrolyte film having a hydrotalcite additive amount of greater than 50 wt % is prepared for the first time, and it is found that the lithium aluminum hydrotalcite-based organic/inorganic solid electrolyte film exhibits a higher ionic conductivity at room temperature and a relatively wide electrochemical window. Specifically, the lithium aluminum hydrotalcite-based solid electrolyte film exhibits an ionic conductivity of greater than $10^{-3}$ S·cm$^{-1}$ at room temperature and an electrochemical stability window of greater than 5 V, which are significantly better than those of the solid electrolytes reported in the current literature.

2) In the present disclosure, the excellent properties of the solid electrolyte are attributed to the following factors: The lithium aluminum hydrotalcite is added to the solid electrolyte for the first time at a mass fraction of greater than or equal to 50 wt % to play a role of conducting lithium ions, that is, the high ionic conductivity of the solid polymer electrolyte material is attributed to a large number of lithium vacancies in the lithium aluminum hydrotalcite material itself. At the same time, the lithium aluminum hydrotalcite can serve as a catalyst to promote the dissociation of a lithium salt. Due to a high inorganic phase content, the solid electrolyte film provided by the present disclosure is classified as an organic/inorganic composite solid electrolyte film, which breaks the previous rigid cognition that a polymer phase accounts for most of a solid electrolyte film.

In the past, the additive amount of the inorganic phase in the solid electrolyte is very small, generally 1 wt % to 5 wt %, and the role of the inorganic phase is to increase an amorphous region of the organic phase and promote the dissociation of a lithium salt. That is, the previous solid electrolyte with an inorganic phase is essentially still polymer electrolyte dominated by an organic phase. In the reports, a single-layer lamellar lithium aluminum hydrotalcite nanosheet with a low load of 1 wt % has been added by those skilled in the art to, merely as a catalyst to promote the dissociation of lithium salts. The lithium aluminum hydrotalcite is present as an inert material that does not conduct lithium ions due to its extremely low addition amount.

DETAILED DESCRIPTION OF THE EMBODIMENTS

The present disclosure will be further described below with reference to examples, but is not limited to the examples. The experimental methods for which specific conditions are not indicated in the examples are generally conducted under conventional conditions, conditions provided in a related manual, or conditions recommended by a manufacturer. Unless otherwise specified, general devices, materials, reagents, or the like used are commercially available. The raw materials required in the following examples and comparative examples are commercially available.

Example 1

Preparation of a Lithium Aluminum Hydrotalcite:
Step 1) 2.59 g of lithium chloride, 4.87 g of aluminum chloride, and 3.3 g of sodium meta-aluminate were dissolved in 40 mL of deionized water that had been introduced with nitrogen and boiled, obtaining a mixture. The mixture was subjected to ultrasound and stirred to dissolve, obtaining a clear and transparent solution. Then 4.2 g of sodium hydroxide was added thereto, so that the resulting mixture solution was subjected to a reaction, producing a lithium aluminum hydrotalcite precursor.

Step 2) The lithium aluminum hydrotalcite precursor prepared in step 1) was placed under argon protection and calcined at 100° C. for 4 h to remove water between hydrotalcite layers. The resulting calcined sample was ground to powder, and sieved through a 200-mesh sieve. The grinding-sieving process was repeated until all of the calcined sample passed through the 200-mesh sieve.

Figure 1:
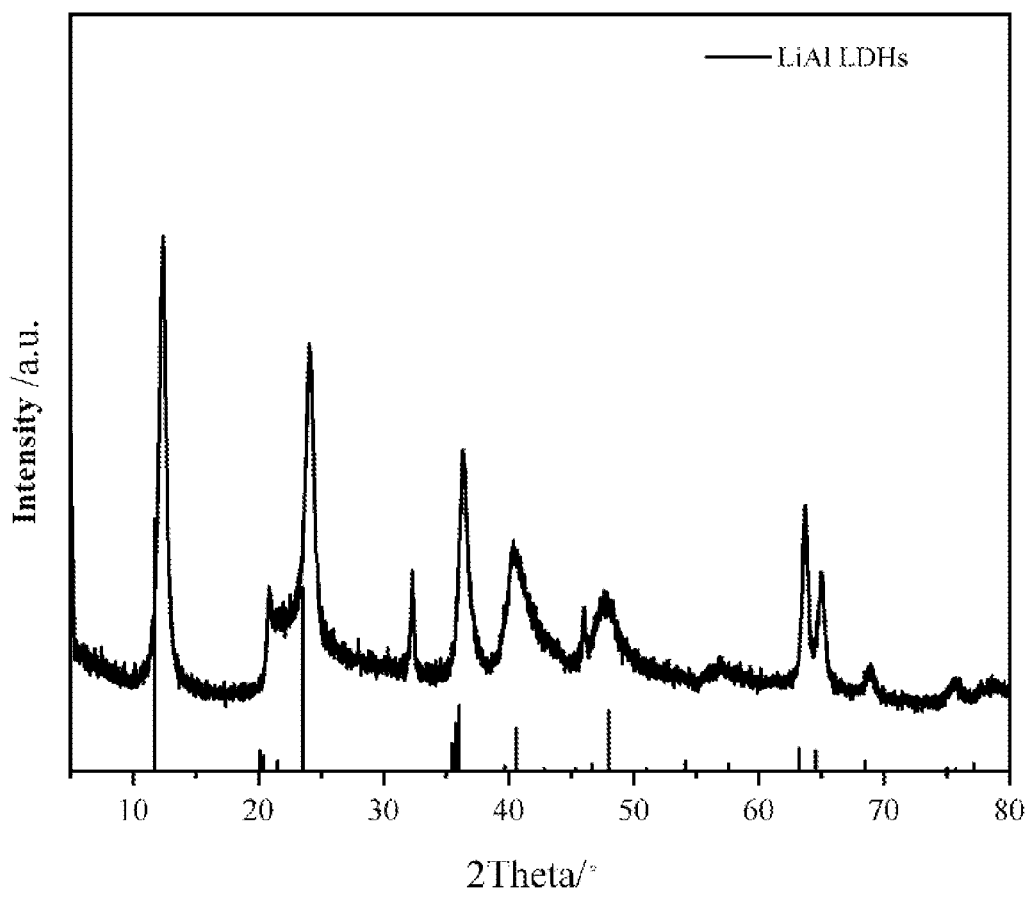
FIG. 1 shows an X-ray diffraction (XRD) pattern of the lithium aluminum hydrotalcite prepared in Example 1 according to the present disclosure.
Figure 2:
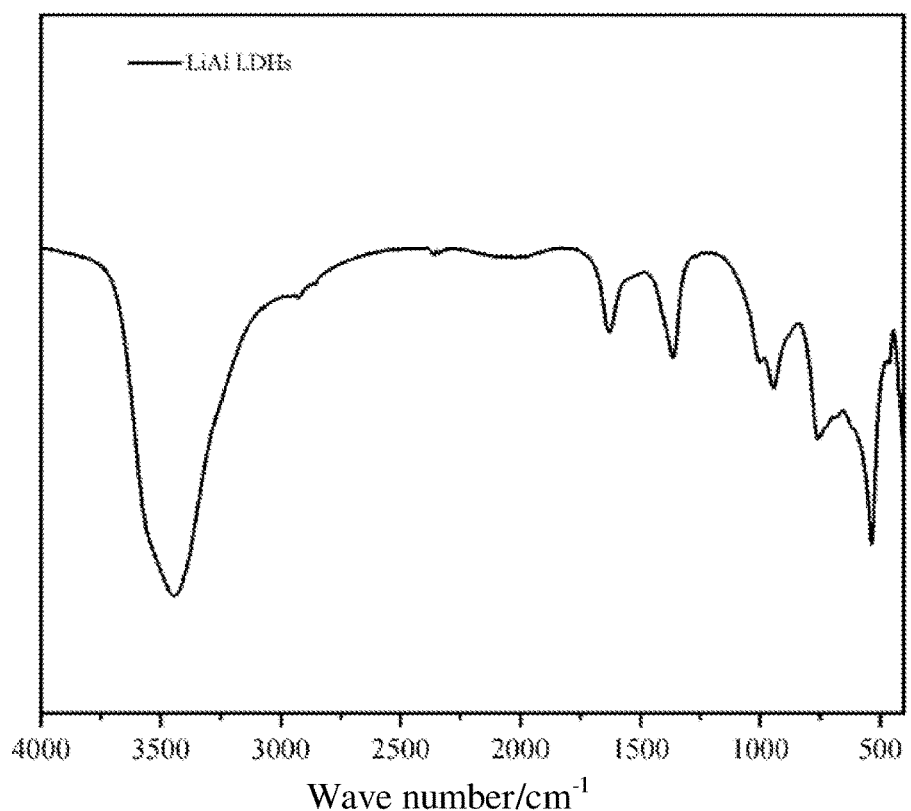
FIG. 2 shows a Fourier transform infrared (FTIR) spectrum of the lithium aluminum hydrotalcite prepared in Example 1 according to the present disclosure.
Figure 3:
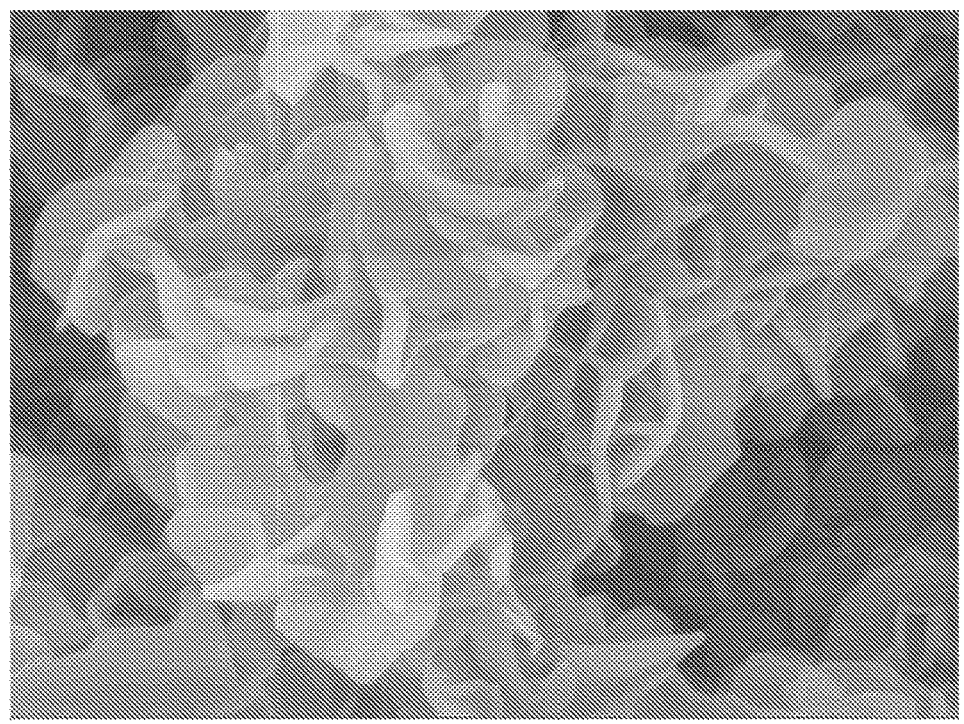
FIG. 3 shows a scanning electron microscopy (SEM) image of the lithium aluminum hydrotalcite prepared in Example 1 according to the present disclosure.

The above material was characterized: the XRD pattern of the lithium aluminum hydrotalcite prepared in Example 1 is shown in FIG. 1; the FTIR spectrum of the prepared lithium aluminum hydrotalcite is shown in FIG. 2; and the SEM image of the prepared lithium aluminum hydrotalcite is shown in FIG. 3.

It can be seen from FIG. 1 that the XRD pattern of the prepared hydrotalcite material corresponds to a standard pattern of the lithium aluminum hydrotalcite intercalated by chloride ions, indicating that the hydrotalcite material prepared according to the present disclosure is a lithium aluminum hydrotalcite intercalated by chloride ions material.

It can be seen from FIG. 2 that there is a peak attributed to meta-aluminate at a wave number of about 1,000, indicating that the prepared lithium aluminum hydrotalcite intercalated by chloride ions contains meta-aluminate ions.

It can be seen from FIG. 3 that the prepared lithium aluminum hydrotalcite is a nanosheet having a size of about 10 nm.

Example 2

After the lithium aluminum hydrotalcite intercalated by chloride ions material doped with meta-aluminate was synthesized, a composite solid electrolyte film was prepared by a process including the following steps:

1) The lithium aluminum hydrotalcite sample obtained in Example 1 was transferred to a glove box and used to prepare a lithium aluminum hydrotalcite-based solid electrolyte slurry for later use, which was prepared as follows:

3 mL of an organic solvent was added to a sample bottle to dissolve and disperse an organic phase and an inorganic phase. Then 0.67 g of PEGDA with a molecular weight of 700 and 0.4 g of a lithium salt were added thereto, obtaining a first mixture, and the first mixture was stirred to complete dissolution. Then 1 g of the lithium aluminum hydrotalcite was added thereto, obtaining a second mixture, and the second mixture was subjected to ultrasound and stirred to homogeneous dispersion, Then 0.0167 g of phenylbis(2,4,6-trimethylbenzoyl) phosphine oxide as a photoinitiator or AIBN as a thermal initiator was added thereto.

Wherein a mass ratio of the PEGDA to the lithium salt was 1.34:1 to control a molar ratio of an EO segment to lithium ions at 20:1.

2) The prepared composite lithium aluminum hydrotalcite-based solid electrolyte slurry was transferred to a PTFE plate, and subjected to scrape coating, then irradiated with a UV lamp having a UV wavelength of 365 nm for 5 min, so that the composite lithium aluminum hydrotalcite-based solid electrolyte slurry was subjected to curing and film-forming, obtaining a film. Wherein a distance between the UV lamp and the sample was 10 cm.

3) The obtained solid electrolyte film was cut to an appropriate size as needed.

The solid electrolyte film had a thickness of 70 µm to 90 µm by testing.

The solid electrolyte film contained 1 g of the lithium aluminum hydrotalcite, 0.67 g of the PEGDA, and 0.4 g of the lithium salt. It was calculated that, the proportions of the inorganic phase and the organic phase in the solid electrolyte film were respectively as follows: the inorganic phase lithium aluminum hydrotalcite had a content of 59.9 wt % and the organic phase had a content of 40.1 wt %, where the contents each was calculated based on a total mass of a solid electrolyte film after removal of the lithium salt.

Figure 4:
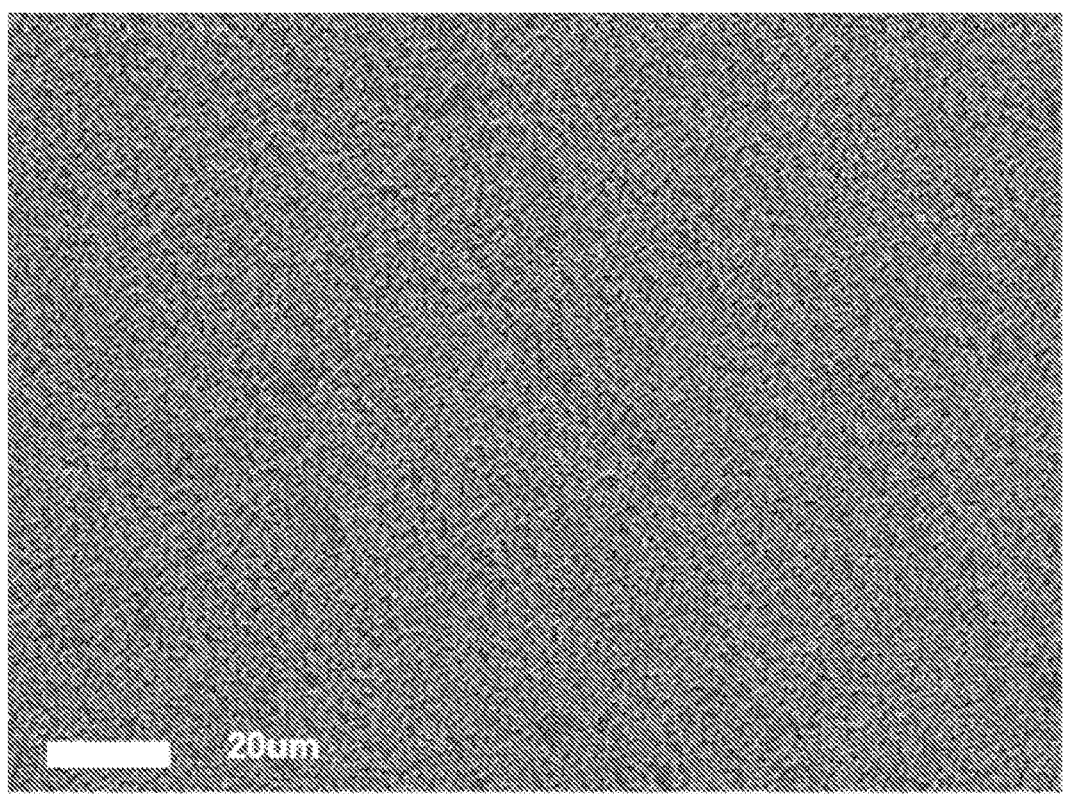
FIG. 4 shows an SEM image of the lithium aluminum hydrotalcite-based organic/inorganic composite solid electrolyte film prepared in Example 2 according to the present disclosure.

The solid electrolyte film prepared in Example 2 was characterized. The SEM image of the solid electrolyte film is shown in FIG. 4. It can be seen from FIG. 4 that the composite solid electrolyte film has a relatively smooth surface. The above lithium aluminum hydrotalcite and the composite solid electrolyte film were characterized. The TGA curves of the composite lithium aluminum hydrotalcite and the solid electrolyte film are shown in FIG. 5.

Figure 5:
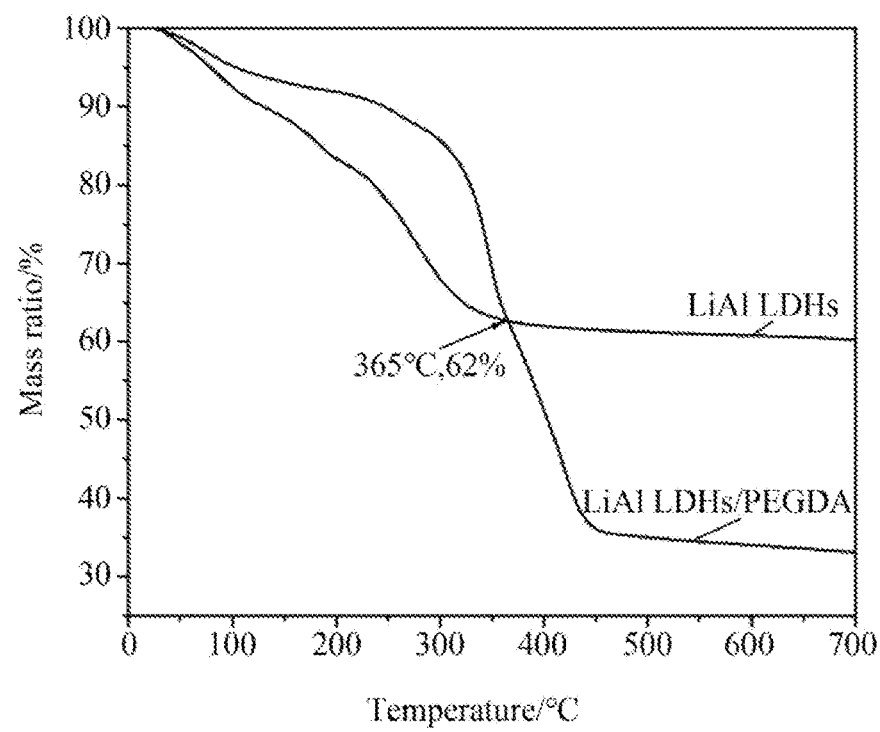
FIG. 5 shows a thermogravimetric analysis (TGA) curve graph of the lithium aluminum hydrotalcite-based organic/inorganic composite solid electrolyte film prepared in Example 2 according to the present disclosure and the lithium aluminum hydrotalcite prepared in Example 1 according to the present disclosure.

It can be seen from FIG. 5 that both the composite solid electrolyte film and the lithium aluminum hydrotalcite have excellent thermal stability, and specifically, both the composite solid electrolyte film and the lithium aluminum hydrotalcite do not undergo any obvious decomposition at 200° C.

Example 3

The solid electrolyte film prepared in Example 2 was used as a battery separator. A lithium sheet/stainless steel battery was assembled in a glove box in an order of a negative electrode shell, a lithium sheet, the composite solid electrolyte film, a gasket, a shrapnel, and a positive electrode shell. Linear sweep voltammetry (LSV) was carried out to test the electrochemical stability window of the composite solid electrolyte film. The LSV curve of the composite solid electrolyte film is shown in FIG. 6.

Figure 6:
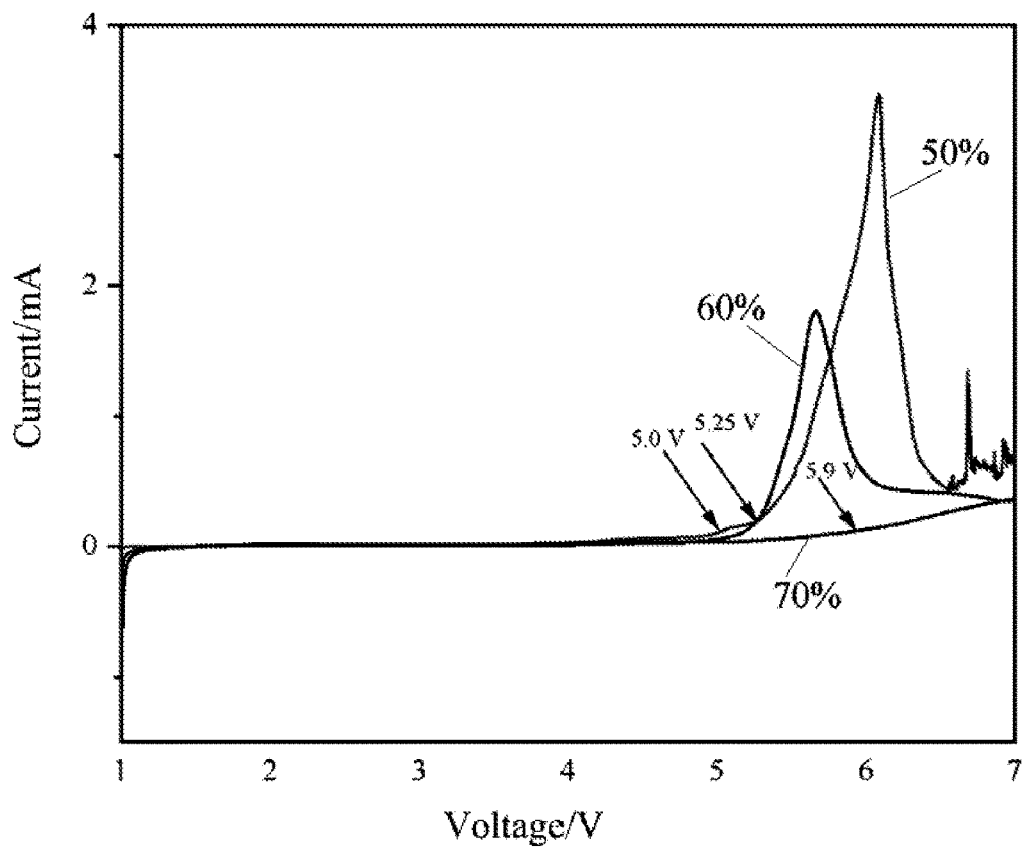
FIG. 6 shows an electrochemical stability window graph of the measured lithium aluminum hydrotalcite-based organic/inorganic composite solid electrolyte film in the lithium/stainless steel battery assembled in Example 3 according to the present disclosure.
Figure 7:
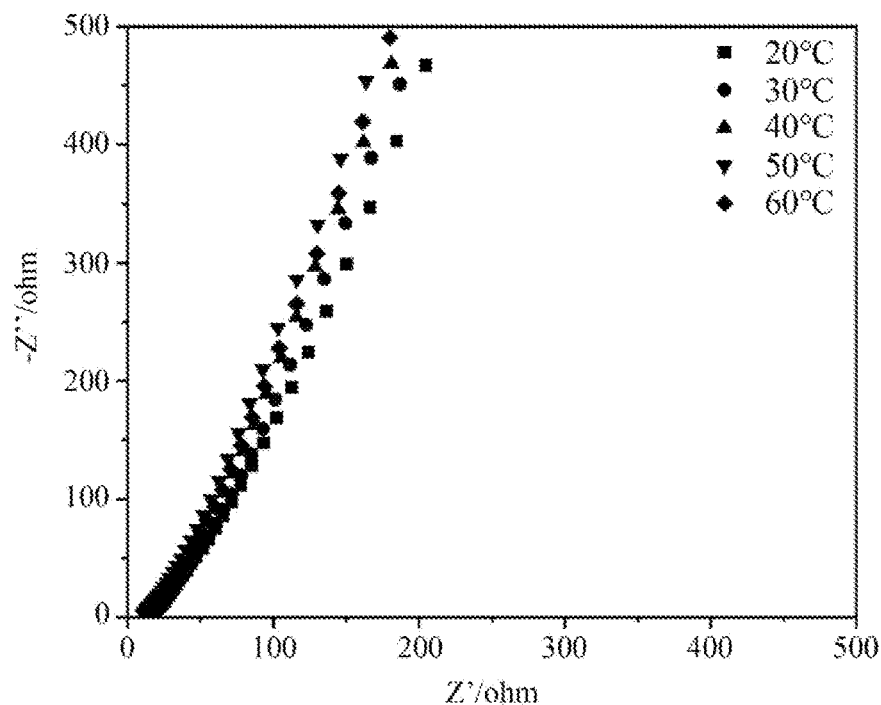
FIG. 7 is a graph showing the variation tendency of the ionic conductivity versus temperature of the measured lithium aluminum hydrotalcite-based organic/inorganic composite solid electrolyte film in the stainless steel/stainless steel battery assembled in Example 3 according to the present disclosure.

As shown in FIG. 6, the prepared composite solid electrolyte film exhibits an electrochemical stability window up to 5.25 V. In addition, a stainless steel symmetrical battery was assembled in an order of a negative electrode shell, a gasket, the composite solid electrolyte film, a gasket, a shrapnel, and a positive electrode shell. AC Impedance was carried out to test the ionic conductivity at room temperature of the composite solid electrolyte film. The ionic conductivity curve of the composite solid electrolyte film is shown in FIG. 7. After calculation, it can be seen that the prepared composite solid electrolyte film exhibits an ionic conductivity of greater than $10^{-5}$ S·cm$^{-1}$ at room temperature, and specifically $2.29 \times 10^{-3}$ S·cm$^{-1}$.

Figure 9:
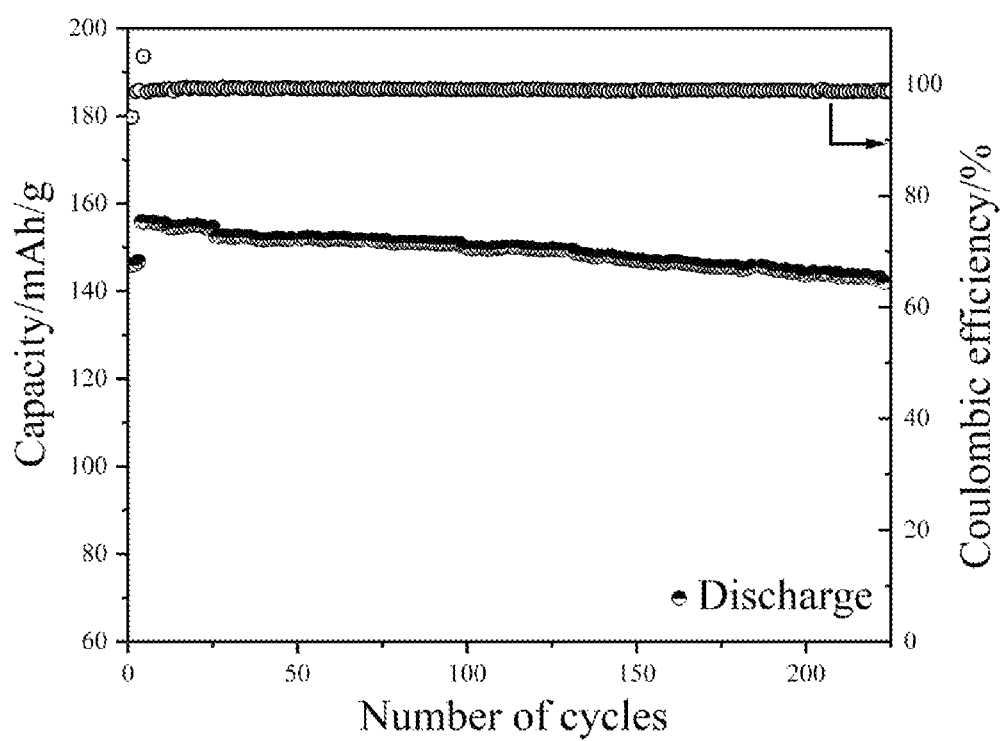
FIG. 9 shows a cycling performance graph of the full solid lithium battery assembled in Example 3 according to the present disclosure at room temperature and a rate of 0.3 C.
Figure 10:
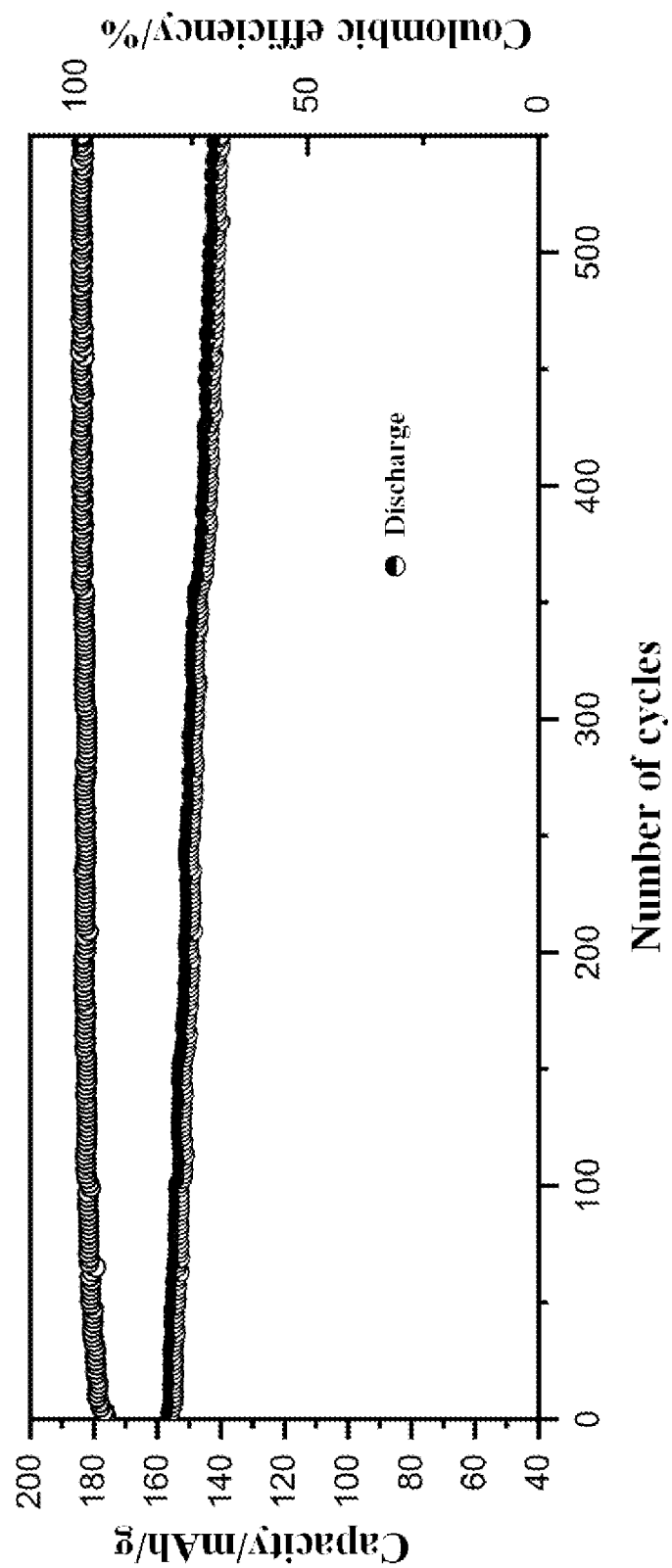
FIG. 10 shows a cycling performance graph of the full solid lithium battery assembled in Example 3 according to the present disclosure at room temperature and a rate of 0.5 C.

A full battery was assembled in an order of a negative electrode shell, a lithium sheet, the composite solid electrolyte film, a lithium iron phosphate positive electrode, a gasket, a shrapnel, and a positive electrode shell. Cycling performance test was carried out, The cycling performance graphs are shown in FIG. 8, FIG. 9, and FIG. 10.

Figure 8:
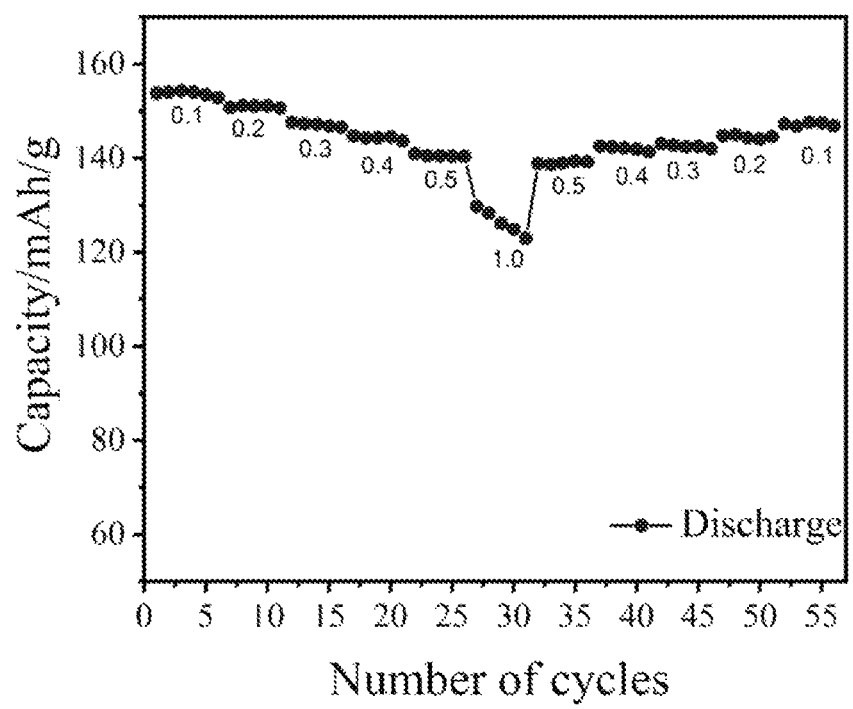
FIG. 8 shows a cycling rate graph of the full solid lithium battery assembled in Example 3 according to the present disclosure at room temperature.

It can be seen from FIG. 8 that the full battery assembled with the composite solid electrolyte film as a separator exhibits excellent rate performance. FIG. 9 and FIG. 10 show cycling performance graphs of the full battery assembled with the composite solid electrolyte film as a separator at room temperature and at rates of 0.3 C and 0.5 C, respectively. It can be seen from FIG. 9 and FIG. 10 that the full battery assembled with the composite solid electrolyte film as a separator exhibits excellent cycling performance, and can be stably cycled for 500 or more cycles at a high rate of 0.5 C, the capacity retention rate being up to 90%.

Example 4

A composite solid electrolyte film was prepared according to the method in Example 2, except that:

The organic polymer was PVDF-HFP having a molecular weight of 600,000.

The solid electrolyte film contained 1 g of the lithium aluminum hydrotalcite material, 0.67 g of the PVDF-HFP, and 0.67 g of the lithium salt. That is, in the solid electrolyte film, a content of the lithium aluminum hydrotalcite material was 59.9 wt %, and the content was calculated based on a total mass of a solid electrolyte film after removal of the lithium salt.

The curing and film-forming was conducted by a process as follows: the solid electrolyte slurry was poured into a PTFE mold, forming a film through solution-casting, and the film was transferred to a drying oven and dried for 36 h to remove the organic solvent therein, obtaining a lithium aluminum hydrotalcite-based solid electrolyte film.

The solid electrolyte film had a thickness of 80 μm to 120 μm by testing.

The obtained solid electrolyte film was cut to an appropriate size as needed and used to assemble a battery in a glove box. The battery was subjected to a cycling performance test.

Figure 11:
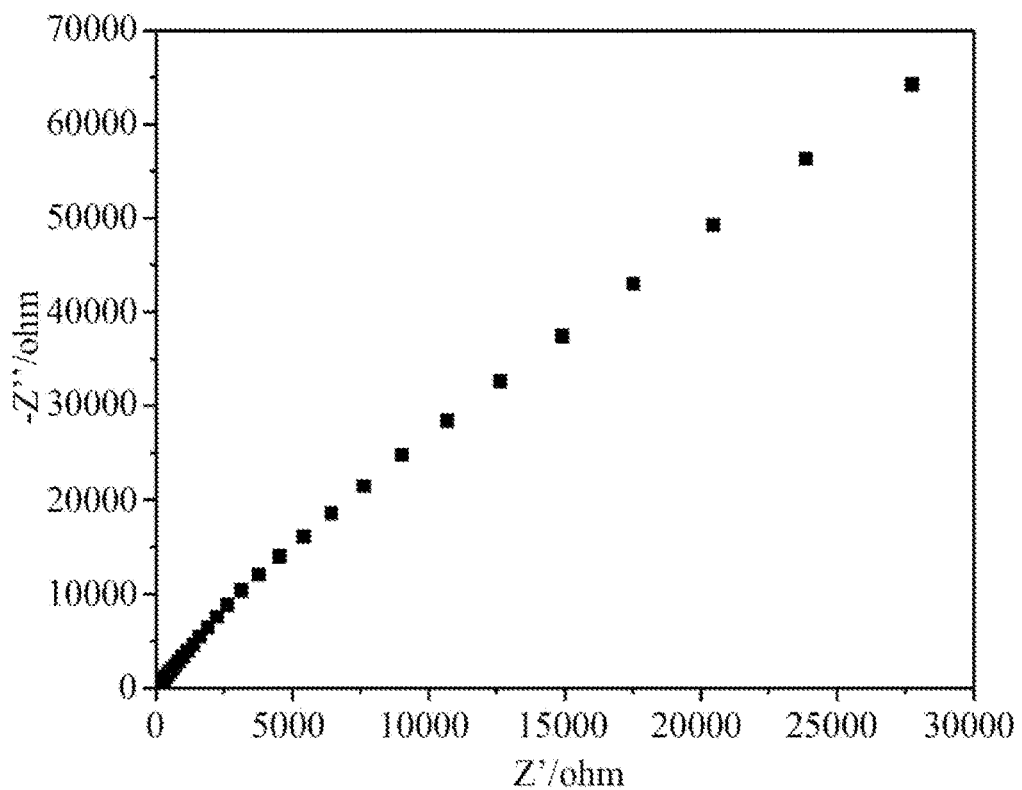
FIG. 11 is a graph showing the ionic conductivity at room temperature of the solid electrolyte film prepared in Example 4 according to the present disclosure.
Figure 12:
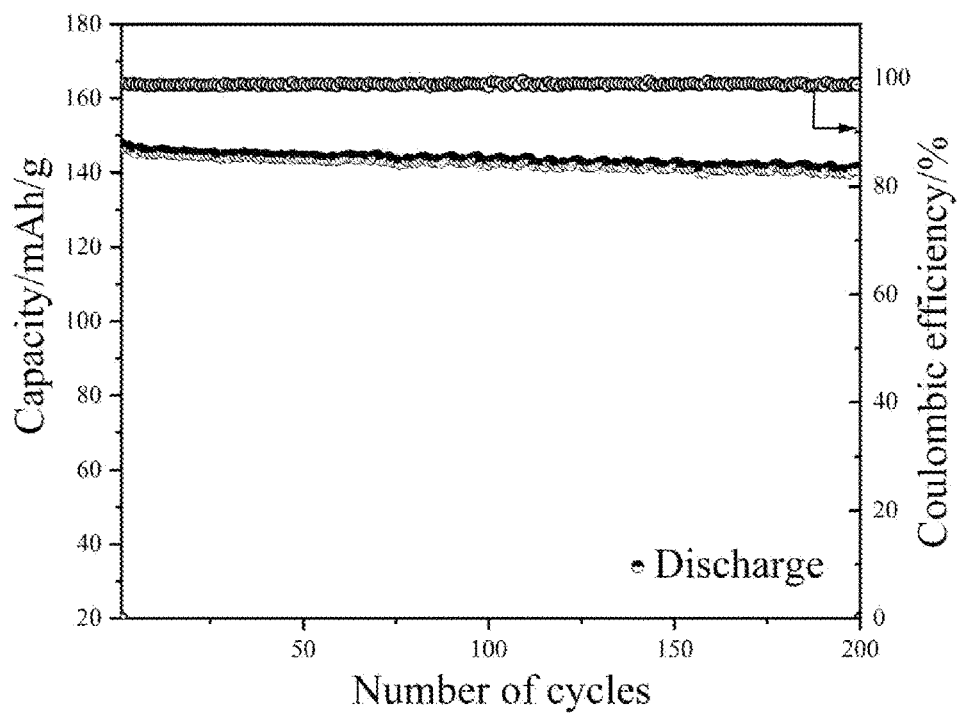
FIG. 12 shows a cycling performance graph of the full solid lithium battery assembled in Example 4 according to the present disclosure at room temperature and a rate of 0.5 C.

It can be seen from FIG. 11 that the conductivity at room temperature of the organic/inorganic composite solid electrolyte film prepared by compounding the PVDF-HFP as an organic phase with the lithium aluminum hydrotalcite was calculated. It is found that the ionic conductivity of the prepared composite solid electrolyte film was greater than $10^{-5}$ S·cm$^{-1}$ at room temperature, and specifically 3.89×10$^{-4}$ S·cm$^{-1}$. It can be seen from FIG. 12 that the solid electrolyte film prepared with the PVDF-HFP as an organic phase still exhibits better cycling performance at a rate of 0.5 C, and can be stably cycled for 200 or more cycles, with an average coulomb efficiency of greater than 98.5%.

Example 5

A composite solid electrolyte film was prepared according to the method in Example 2, except that:

The organic polymer was PEO having a molecular weight of 600,000.

A mass of the lithium aluminum hydrotalcite material was 1 g, a mass of the PEO was 0.67 g, and a mass of the lithium salt was 0.8 g. That is, in the solid electrolyte film, a content of the inorganic phase lithium aluminum hydrotalcite material was 59.9 wt %, a content of the organic phase (organic polymer) was 40.1 wt %, and the contents each were calculated based on a total mass of a solid electrolyte film after removal of the lithium salt.

The curing and film-forming was conducted by a process as follows: the solid electrolyte slurry was poured into a PTFE mold, forming a film through solution-casting, and the film was first dried at room temperature for 4 h, then transferred to a drying oven and dried for 36 h to remove the organic solvent therein, obtaining a lithium aluminum hydrotalcite-based solid electrolyte film.

The solid electrolyte film had a thickness of 80 μm to 120 μm by testing.

The obtained solid electrolyte film was cut to an appropriate size as needed and used to assemble a battery in a glove box. The battery was subjected to a cycling performance test.

Figure 13:
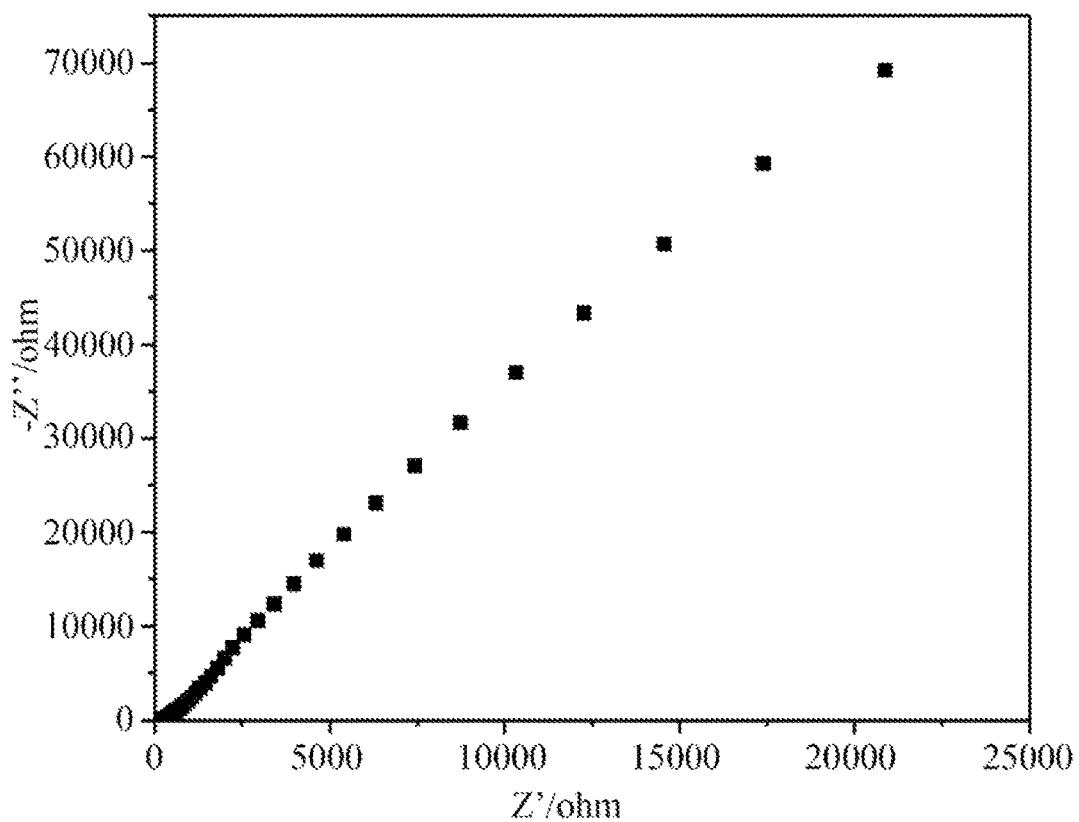
FIG. 13 is a graph showing the ionic conductivity at room temperature of the solid electrolyte film prepared in Example 5 according to the present disclosure.
Figure 14:
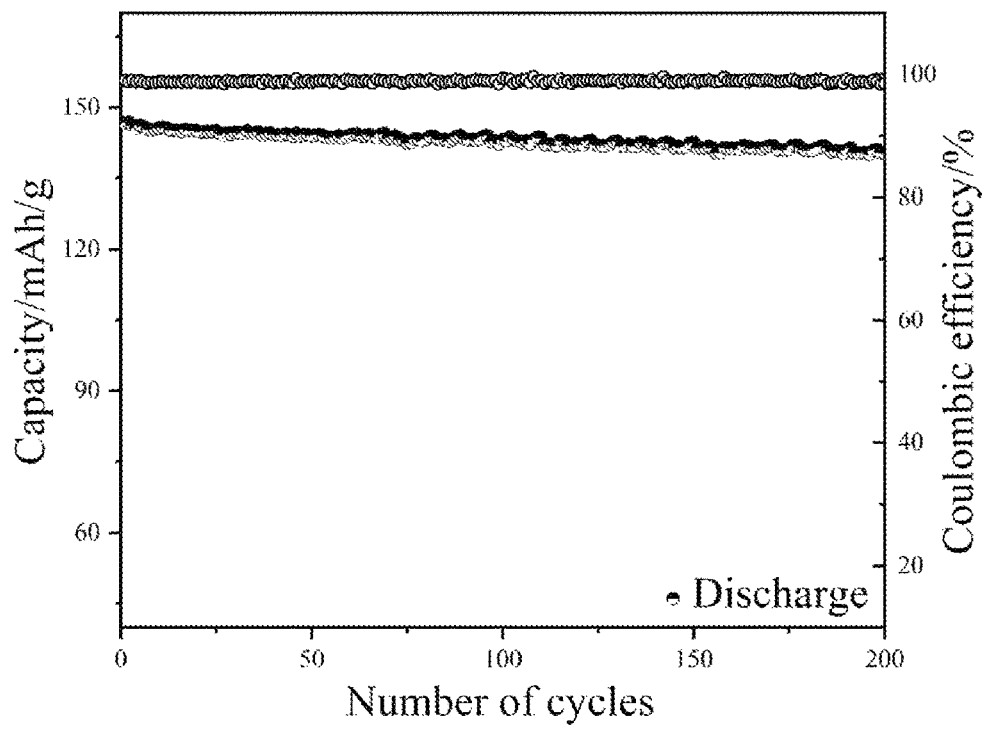
FIG. 14 shows a cycling performance graph of the full solid lithium battery assembled in Example 5 according to the present disclosure at room temperature and a rate of 0.5 C.

It can be seen from FIG. 13 that the conductivity at room temperature of the organic/inorganic composite solid electrolyte film prepared by compounding the PEO as an organic phase with the lithium aluminum hydrotalcite was calculated. It is found that the prepared composite solid electrolyte film exhibits an ionic conductivity of greater than $10^{-5}$ S·cm$^{-1}$ at room temperature, and specifically 1.30×10$^{-4}$ S·cm$^{-1}$. It can be seen from FIG. 14 that the solid electrolyte film prepared with the PEO as an organic phase still exhibits better cycling performance at a rate of 0.5 C, and can be stably cycled for 200 cycles, with average coulomb efficiency of greater than 98.87%.

Example 6

Figure 17:
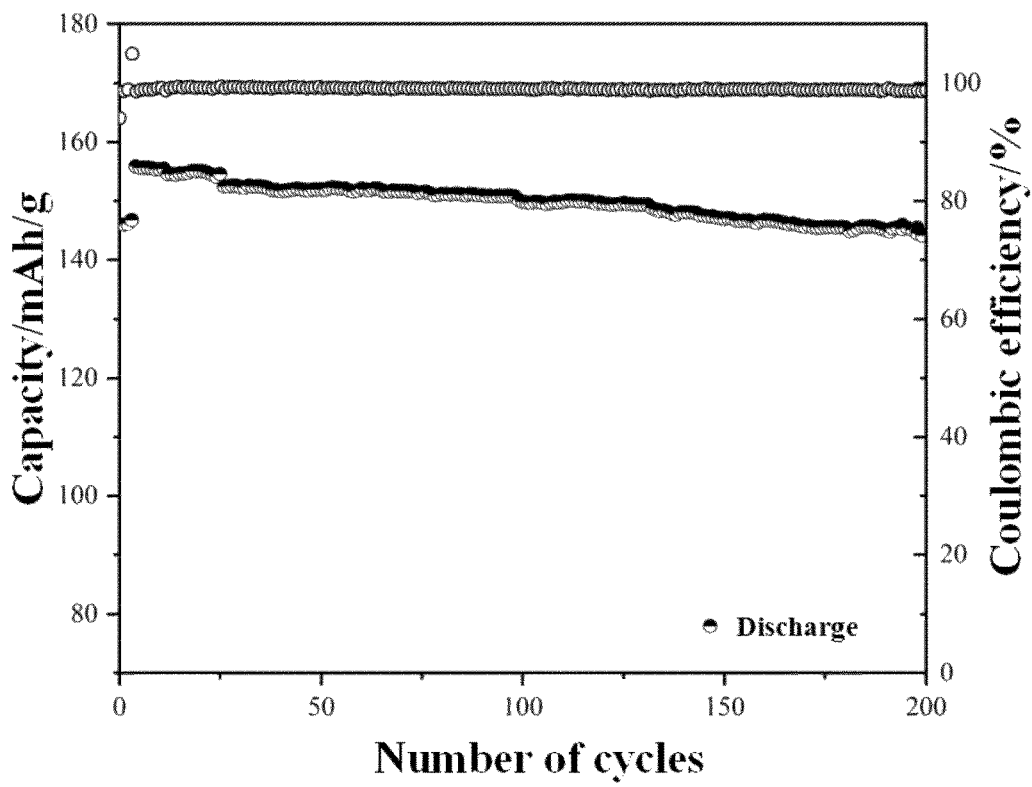
FIG. 17 shows a cycling performance graph of the full solid lithium battery assembled in Example 6 according to the present disclosure at room temperature and a rate of 0.5 C.

A composite solid electrolyte film was prepared according to the method in Example 2, except that:

In the preparation of the solid electrolyte slurry, the mass of the added PEGDA was adjusted from 0.67 g to 1 g and the mass of the lithium salt was adjusted from 0.4 g to 0.6 g. The film-forming mode and the performance test type were the same as those in Example 2. The solid electrolyte film contained 1 g of the lithium aluminum hydrotalcite, 1 g of the PEGDA, and 0.6 g of the lithium salt. That is, in the solid electrolyte film, the lithium aluminum hydrotalcite had a content of 50 wt %, and the content was calculated based on a total mass of a solid electrolyte film after removal of the lithium salt. The obtained solid electrolyte film was cut to an appropriate size as needed and used to assemble a battery in a glove box. The battery was subjected to a cycling performance test, as shown in FIG. 17.

Figure 15:
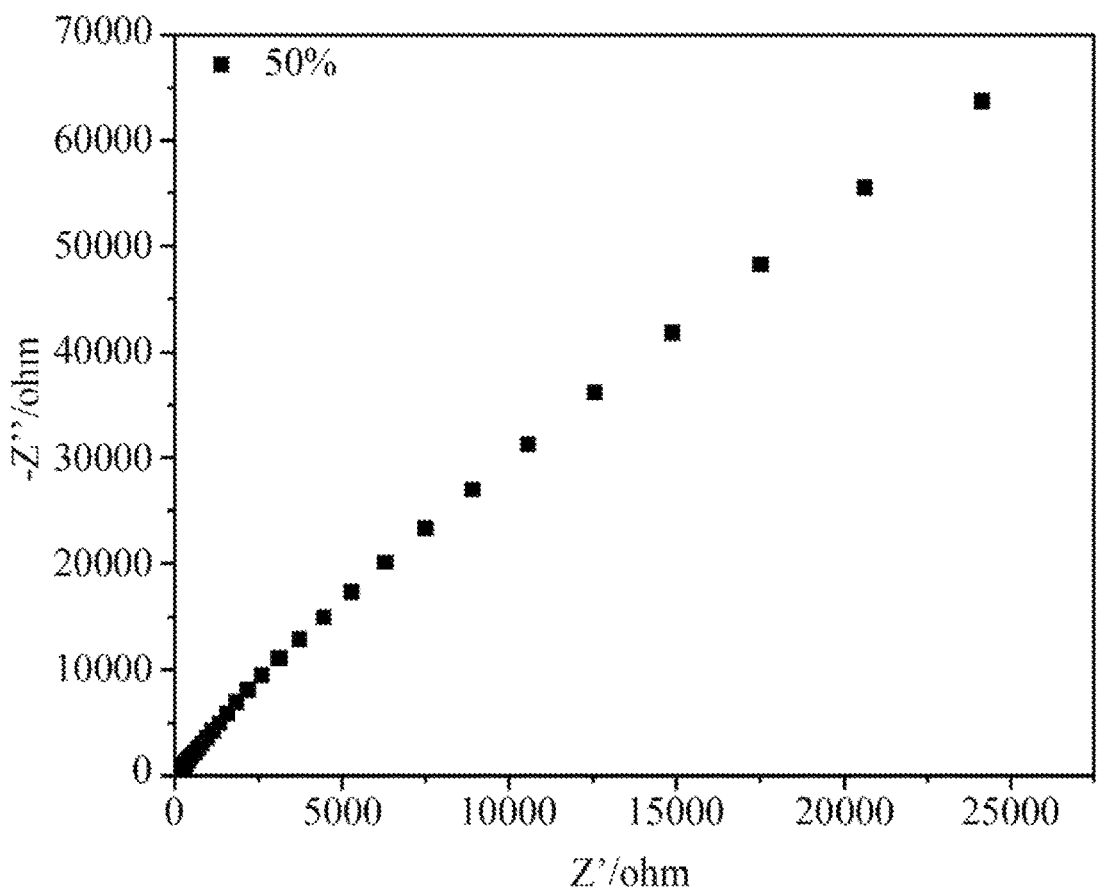
FIG. 15 is a graph showing the ionic conductivity of the solid electrolyte film prepared in Example 6 according to the present disclosure at room temperature.
Figure 16:
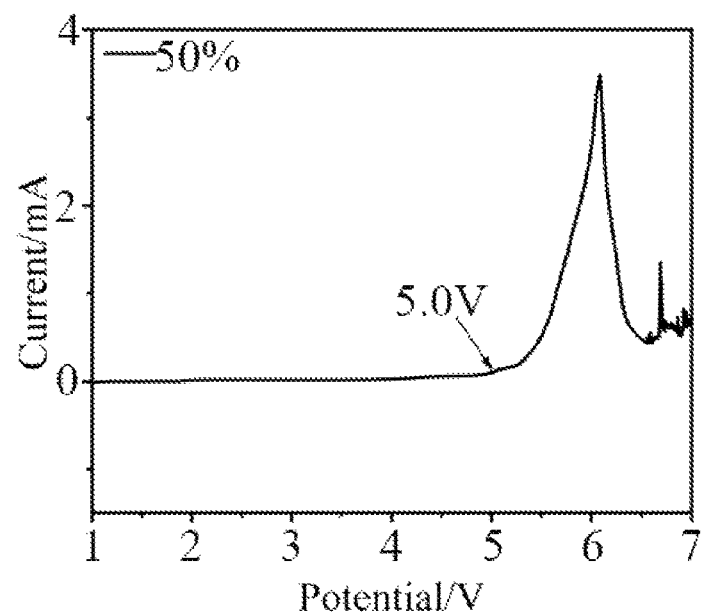
FIG. 16 shows an electrochemical stability window graph of the measured lithium aluminum hydrotalcite-based organic/inorganic composite solid electrolyte film in the lithium/stainless steel battery assembled in Example 6 according to the present disclosure.

It can be seen from FIG. 15 that the conductivity at room temperature of the organic/inorganic composite solid electrolyte film prepared by compounding the lithium aluminum hydrotalcite having a hydrotalcite proportion of 50 wt % was calculated. It is found after the calculation that the prepared composite solid electrolyte film exhibits an ionic conductivity of greater than $10^{-5}$ S·cm$^{-1}$ at room temperature, and specifically 3.86×10$^{-4}$ S·cm$^{-1}$. As shown in FIG. 16, the prepared composite solid electrolyte film exhibits an electrochemical stability window up to 5 V. It can be seen from FIG. 17 that the prepared solid electrolyte film still exhibits better cycling performance at a rate of 0.5 C, and can be stably cycled for 200 or more cycles.

Example 7

Figure 20:
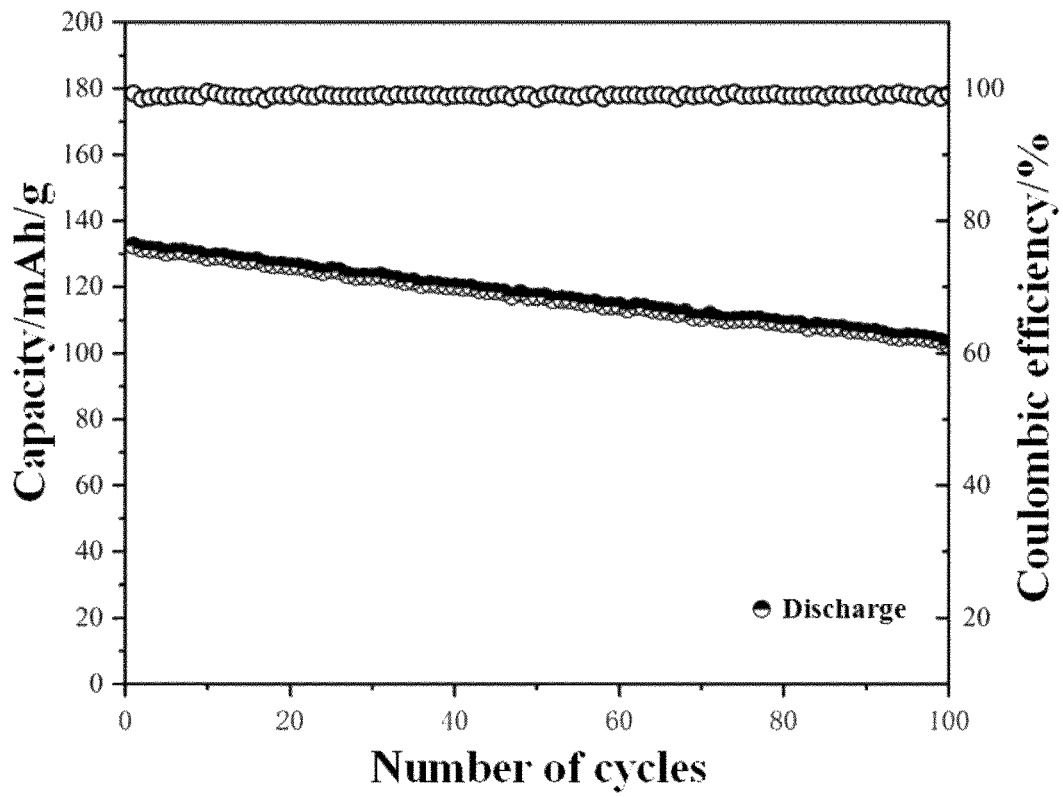
FIG. 20 shows cycling performance graph of the full solid lithium battery assembled in Example 7 according to the present disclosure at room temperature and a rate of 0.5 C.

A composite solid electrolyte film was prepared according to the method in Example 2, except that:

In the preparation of the solid electrolyte slurry, the mass of the added PEGDA was adjusted from 0.67 g to 0.43 g and the mass of the lithium salt was adjusted from 0.4 g to 0.26 g. The film-forming mode and the performance test type were the same as those in Example 2. The obtained solid electrolyte film was cut to an appropriate size as needed and used to assemble a battery in a glove box. The battery was subjected to a cycling performance test, as shown in FIG. 20.

The solid electrolyte film contained 1 g of the lithium aluminum hydrotalcite, 0.43 g of the PEGDA, and 0.26 g of the lithium salt. That is, in the solid electrolyte film, the lithium aluminum hydrotalcite had a content of 70 wt %, and the content was calculated based on a total mass of a solid electrolyte film after removal of the lithium salt.

Figure 18:
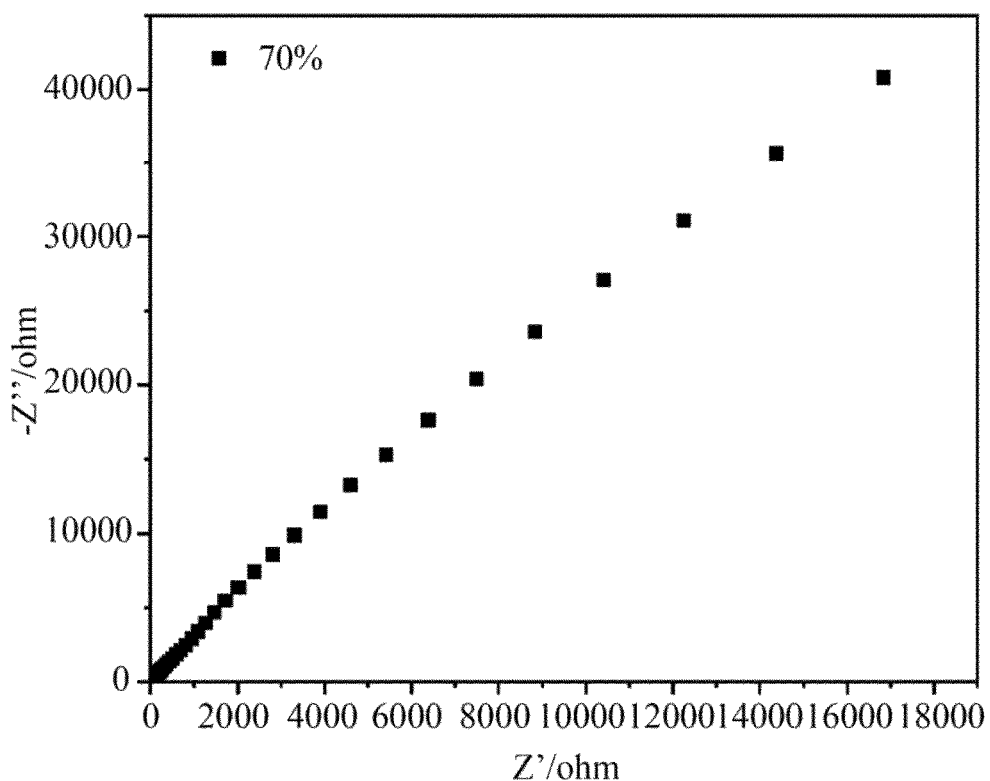
FIG. 18 is a graph showing the ionic conductivity of the solid electrolyte film prepared in Example 7 according to the present disclosure at room temperature.
Figure 19:
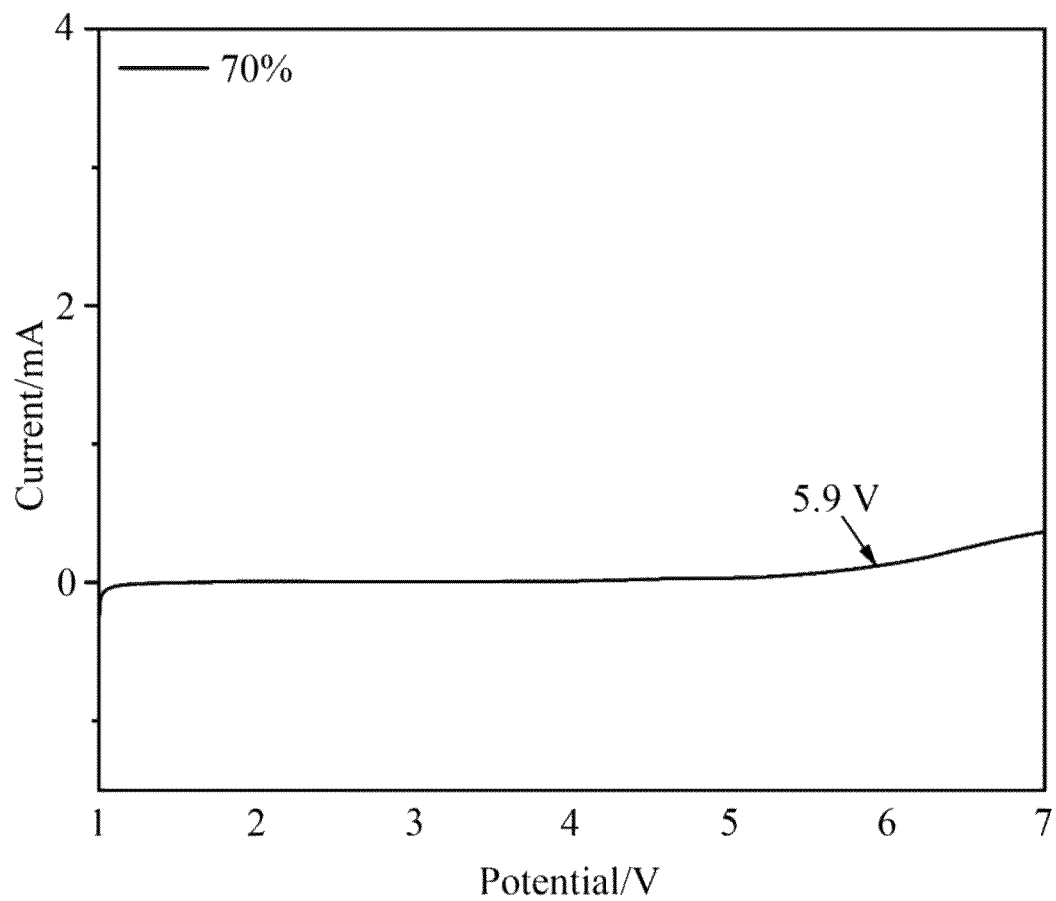
FIG. 19 shows an electrochemical stability window graph of the measured lithium aluminum hydrotalcite-based organic/inorganic composite solid electrolyte film in the lithium/stainless steel battery assembled in Example 7 according to the present disclosure.

It can be seen from FIG. 18 that the conductivity at room temperature of the organic/inorganic composite solid electrolyte film prepared by compounding the lithium aluminum hydrotalcite having a hydrotalcite proportion of 70 wt % was calculated. It is found after the calculation that the prepared composite solid electrolyte film exhibits an ionic conductivity of greater than $10^{-5}$ S·cm$^{-1}$ at room temperature, and specifically $6.05 \times 10^{-4}$ S·cm$^{-1}$. As shown in FIG. 19, the prepared composite solid electrolyte film exhibits an electrochemical stability window up to 5.9 V. It can be seen from FIG. 20 that the prepared solid electrolyte film still exhibits better cycling performance at a rate of 0.5 C, and can be stably cycled for 100 or more cycles.

Example 8

LiAl LDHs were prepared according to the method in Example 1, except that:

In the preparation of LiAl LDHs, nitrates (lithium nitrate and aluminum nitrate) were used instead of the chlorides (lithium chloride and aluminum chloride), and other synthesis conditions were the same as those in Example 1. The subsequent film-forming mode and the performance test type were the same as those in Example 2. The obtained solid electrolyte film was cut to an appropriate size as needed and used to assemble a battery in a glove box. The battery was subjected to a conductivity performance test, as shown in FIG. 21.

Figure 21:
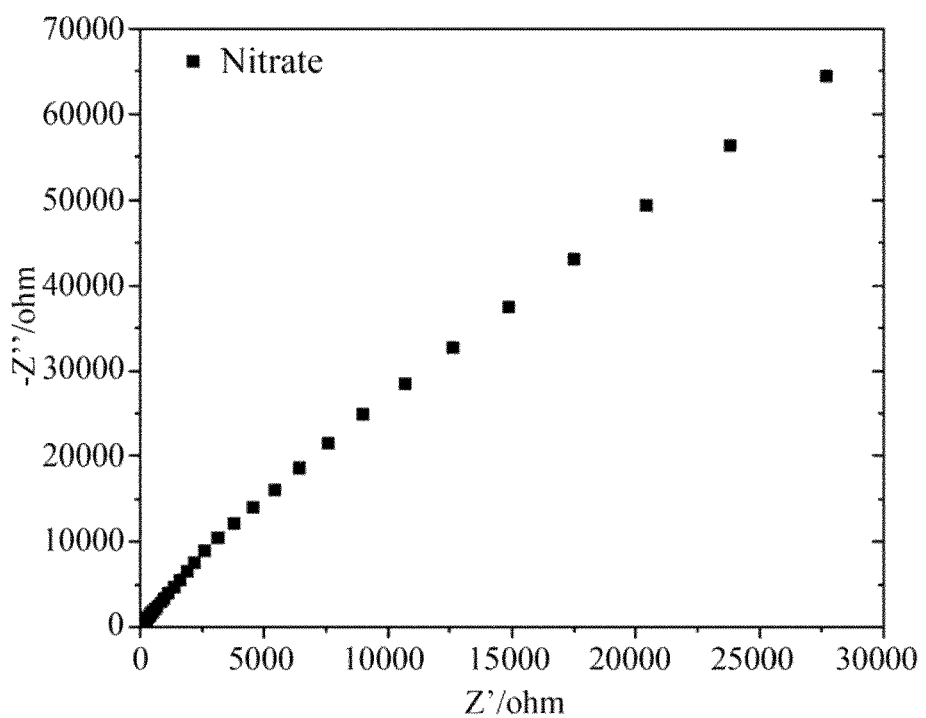
FIG. 21 is a graph showing the ionic conductivity of the solid electrolyte film prepared in Example 8 according to the present disclosure at room temperature.

It can be seen from FIG. 21 that the conductivity at room temperature of the organic/inorganic composite solid electrolyte film prepared by compounding the lithium aluminum hydrotalcite having a hydrotalcite proportion of 60 wt % was calculated. It is found after the calculation that the prepared composite solid electrolyte film exhibits an ionic conductivity of greater than $10^{-4}$ S·cm$^{-1}$ at room temperature, and specifically $2.26 \times 10^{-4}$ S·cm$^{-1}$.

Example 9

LiAl LDHs were prepared according to the method in Example 1, except that:

In the preparation of LiAl LDHs, carbonates (lithium carbonate and aluminum carbonate) were used instead of the chlorides (lithium chloride and aluminum chloride), there was no need to introduce an inert gas during the synthetic process, and other synthesis conditions were the same as those in Example 1. The subsequent film-forming mode and the performance test type were the same as those in Example 2. The obtained solid electrolyte film was cut to an appropriate size as needed and used to assemble a battery in a glove box. The battery was subjected to a conductivity performance test, as shown in FIG. 22.

Figure 22:
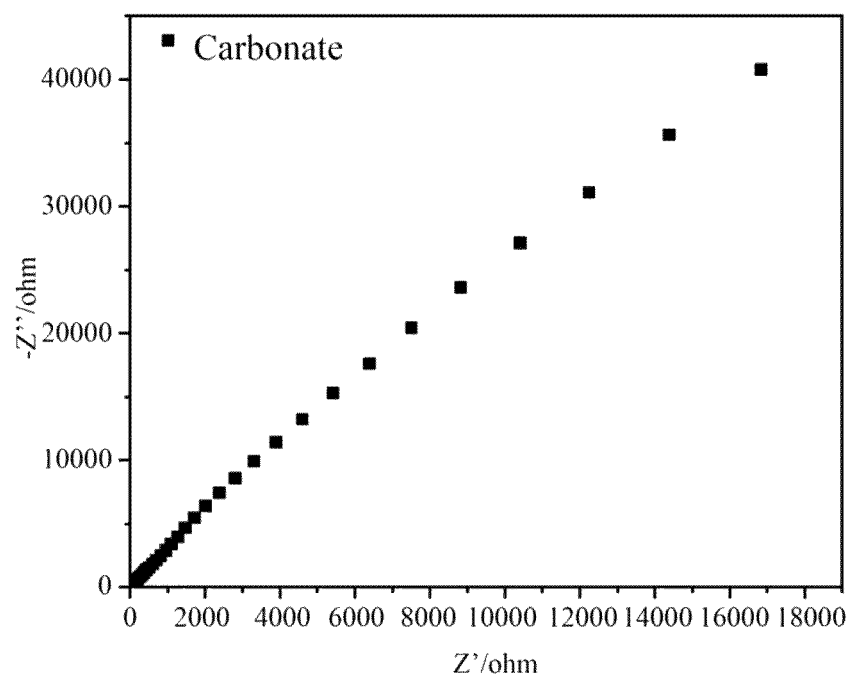
FIG. 22 is a graph showing the ionic conductivity of the solid electrolyte film prepared in Example 9 according to the present disclosure at room temperature.

It can be seen from FIG. 22 that the conductivity at room temperature of the organic/inorganic composite solid electrolyte film prepared by compounding the lithium aluminum hydrotalcite having a hydrotalcite proportion of 60 wt % was calculated. It is found after the calculation that the prepared composite solid electrolyte film exhibits an ionic conductivity of greater than $10^{-4}$ S·cm$^{-1}$ at room temperature, and specifically $2.45 \times 10^{-4}$ S·cm$^{-1}$.

Example 10

LiAl LDHs were prepared according to the method in Example 1, except that:

In the preparation of LiAl LDHs, sulfates (lithium sulfate and aluminum sulfate) were used instead of the chlorides (lithium chloride and aluminum chloride), and other synthesis conditions were the same as those in Example 1. The subsequent film-forming mode and the performance test type were the same as those in Example 2. The obtained solid electrolyte film was cut to an appropriate size as needed and used to assemble a battery in a glove box. The battery was subjected to a conductivity performance test, as shown in FIG. 23.

Figure 23:
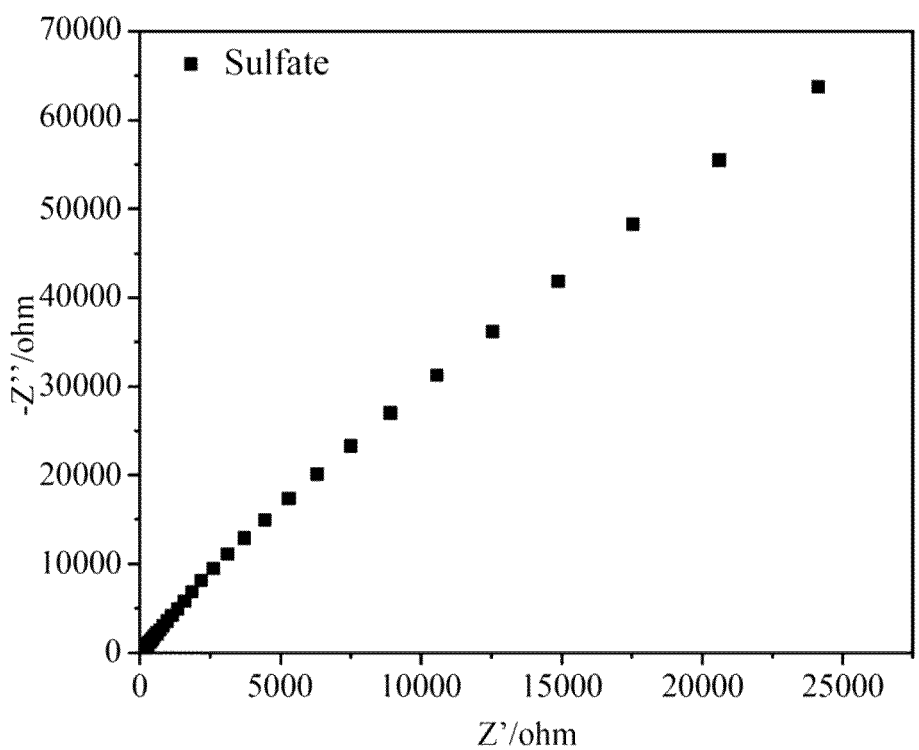
FIG. 23 is a graph showing the ionic conductivity of the solid electrolyte film prepared in Example 10 according to the present disclosure at room temperature.

It can be seen from FIG. 23 that the conductivity at room temperature of the organic/inorganic composite solid electrolyte film prepared by compounding the lithium aluminum hydrotalcite having a hydrotalcite proportion of 60 wt % was calculated. It is found after the calculation that the prepared composite solid electrolyte film exhibits an ionic conductivity of greater than $10^{-4}$ S·cm$^{-1}$ at room temperature, and specifically $3.23 \times 10^{-4}$ S·cm$^{-1}$.

What is claimed is:

1. A method for preparing a lithium aluminum hydrotalcite-based solid electrolyte film working at room temperature, comprising:
    step 1) dissolving a water-soluble lithium salt, a water-soluble aluminum salt, and a water-soluble meta-aluminate in deionized water that has been introduced with an inert gas and boiled to remove carbon dioxide, subjecting a resulting mixture to ultrasound or stirring to dissolve, then adding an alkali thereto to adjust a pH of the resulting mixture to 9 to 11, and controlling a temperature at 60° C. to 80° C., and subjecting a resulting adjusted mixture to reaction to produce a lithium aluminum hydrotalcite;
    step 2) placing the lithium aluminum hydrotalcite obtained in step 1) under protection of an inert gas, calcining at 100° C. to 150° C. for 2 h to 6 h to remove water between hydrotalcite layers to obtain a calcined sample, then grinding the calcined sample to power to obtain a lithium aluminum hydrotalcite powder;
    step 3) preparing a lithium aluminum hydrotalcite-based solid electrolyte slurry for later use by the following operations in a first glove box:
    adding an organic solvent, an organic polymer, and a lithium salt into a container, stirring an obtained mixture to complete dissolution, then adding the lithium aluminum hydrotalcite powder to the obtained mixture, subjecting a resulting blend to ultrasound or stirring to homogeneous dispersion, then adding a photoinitiator or a thermal initiator thereto to obtain the lithium aluminum hydrotalcite-based solid electrolyte slurry; and
    wherein the organic polymer is polyethylene glycol diacrylate (PEGDA); and
    step 4) performing the following operations in a second glove box:
    subjecting the lithium aluminum hydrotalcite-based solid electrolyte slurry obtained in step 3) to curing and film-forming to obtain the lithium aluminum hydrotalcite-based solid electrolyte film;

wherein proportions of an inorganic phase and an organic phase in the solid electrolyte film are respectively as follows: a content of an inorganic phase lithium aluminum hydrotalcite is 59.9 wt %, and a content of the organic phase is 40.1%, based on a total mass of a solid electrolyte film after removal of the lithium salt; and in step 1), the water-soluble lithium salt is lithium chloride; the water-soluble aluminum salt is aluminum chloride; and a molar ratio of lithium to aluminum is in a range of 1:2 to 1:5.

2. The method for preparing the lithium aluminum hydrotalcite-based solid electrolyte film working at room temperature of claim 1, wherein in step 2), during the calcination process, the inert gas is argon and a heating rate is in a range of 5° C./min to 10° C./min.

3. The method for preparing the lithium aluminum hydrotalcite-based solid electrolyte film working at room temperature of claim 1, wherein in step 3), the organic solvent is one or more selected from the group consisting of N,N-dimethylacetamide, acetonitrile, ethylene carbonate, and propylene carbonate; and the photoinitiator is phenylbis(2,4,6-trimethylbenzoyl) phosphine oxide, and the thermal initiator is azobisisobutyronitrile.

4. The method for preparing the lithium aluminum hydrotalcite-based solid electrolyte film working at room temperature of claim 1, wherein under the condition that the organic polymer is the PEGDA, a molar ratio of an ethylene oxide (EO) segment to lithium ion is in a range of 16:1 to 20:1.

5. The method for preparing the lithium aluminum hydrotalcite-based solid electrolyte film working at room temperature of claim 1, wherein in step 4), the curing and film-forming is conducted by a process comprising:

under the condition that the solid electrolyte slurry contains the PEGDA as the organic polymer and the photoinitiator is used in the step 3), transferring the slurry to a polytetrafluoroethylene plate, subjecting the slurry to scrape coating, then irradiating with an ultraviolet (UV) lamp with a UV wavelength of 365 nm for 5 min to 20 min, so that the slurry is cured to form the film; or under the condition that the solid electrolyte slurry contains the PEGDA as the organic polymer and the thermal initiator is used in the step 3), subjecting the slurry to scrape coating, then heating on a heating stage at 60° C. for 5 min to 20 min, so that the slurry is cured to form the film.

* * * * *